United States Patent [19]

Trubee

[11] Patent Number: 5,427,288
[45] Date of Patent: Jun. 27, 1995

[54] PLASTIC GROCERY-BAG HOLDER RACK FOR USE IN VEHICLES

[76] Inventor: Tanya R. Trubee, 4007 E. 27th St., Tucson, Ariz. 85711

[21] Appl. No.: 85,835

[22] Filed: Jul. 6, 1993

[51] Int. Cl.⁶ .............................................. B60R 7/00
[52] U.S. Cl. ........................... 224/42.42; 224/42.45 R; 224/42.46 R
[58] Field of Search ............... 224/42.42, 42.45 R, 224/42.46 R, 309; 211/12, 17, 105.1, 105.6, 123; 296/37.1, 37.5, 37.6; 248/200.1, 214

[56] References Cited

U.S. PATENT DOCUMENTS

| | | | |
|---|---|---|---|
| 946,108 | 1/1910 | Carpenter . | |
| 1,117,880 | 11/1914 | McMillin . | |
| 1,350,443 | 8/1920 | Edstrom . | |
| 2,576,397 | 11/1951 | Grilley | 296/40 |
| 3,022,106 | 2/1962 | Black | 296/29 |
| 3,091,422 | 5/1963 | Hobbs | 248/101 |
| 3,561,077 | 2/1971 | Grant | 24/250 |
| 3,977,450 | 8/1976 | Schampier | 150/1 |
| 3,998,332 | 12/1976 | Lambutoon | 211/123 X |
| 4,723,740 | 2/1988 | Courtemanche et al. | 248/95 |
| 4,744,471 | 5/1988 | Leister | 211/105.6 X |
| 4,921,194 | 5/1990 | Libby | 248/97 |
| 5,092,548 | 3/1992 | Bayes et al. | 248/99 |
| 5,118,156 | 6/1992 | Richard | 296/40 |
| 5,137,158 | 8/1992 | Brockway | 224/42.45 R X |
| 5,287,971 | 2/1994 | Dorman | 224/42.42 X |

Primary Examiner—J. Casimer Jacyna
Assistant Examiner—David J. Wolczak
Attorney, Agent, or Firm—Antonio R. Durando; Harry M. Weiss

[57] ABSTRACT

A grocery-bag holder that consists of a horizontal rack comprising a first fixed end and a second spring-loaded, telescopic end, both ends being adapted for stable engagement with vertical support walls in a vehicle. The rack contains a plurality of hooks disposed along its length and adapted for receiving the handles of conventional plastic grocery bags and holding them in an upright position. The hooks are preferably evenly spaced for optimal space utilization during transport of the grocery bags.

7 Claims, 1 Drawing Sheet

U.S. Patent      June 27, 1995      5,427,288
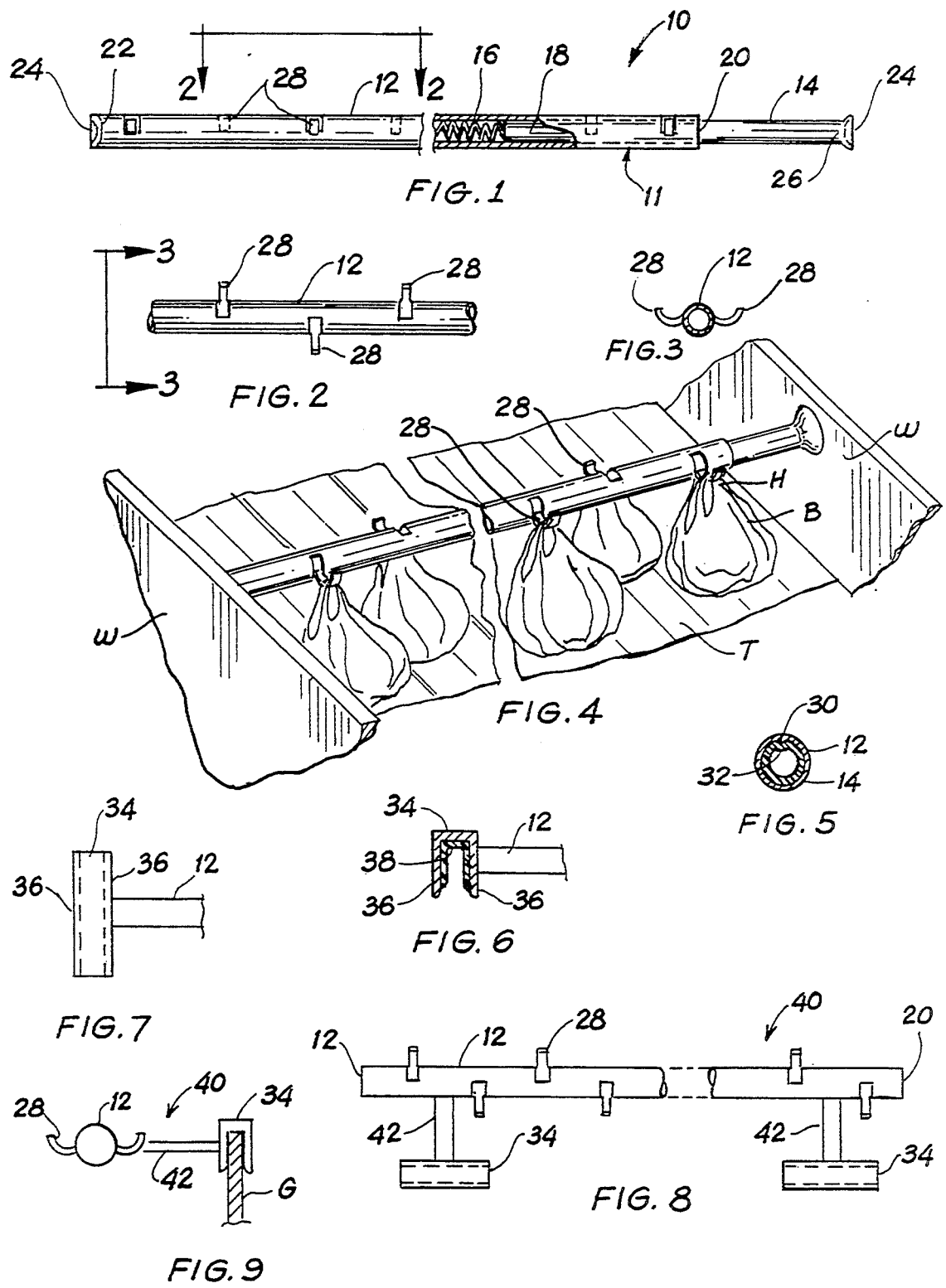

PLASTIC GROCERY-BAG HOLDER RACK FOR USE IN VEHICLES

BACKGROUND OF THE INVENTION

1. Field of the Invention

This invention is related in general to the field of bag holders and, in particular, to a device designed for holding in place conventional plastic grocery bags when such bags, filled with groceries or other items, are being transported in a vehicle.

2. Description of the Related Art

Almost all grocery stores and supermarkets as well as many other types of retailers provide plastic bags to customers for carrying purchases. Probably the most often used type is commonly referred to as a T-shirt bag, made of a thin plastic material with cutouts at the open end to form two handles for carrying the bag.

Unlike a box or other container with rigid confines, such a plastic bag has no ability to maintain any shape apart from the shape of whatever items the bag may be enveloping and is unable to prevent the items within it from causing the shape and position of the bag to shift. The bag does not have sufficient rigidity to keep the enclosed items in a space defined by the dimensions of the bag; if the items shift to a different position, the bag will also move. Hence, when a bag of items is placed in a vehicle, the items tend to move, roll about, shift position and fall out of the bag as the vehicle moves and turns. This is particularly true in the case of bags stored on the back of pick-up trucks, where the bags are free to move unimpaired by surrounding structures. The present invention is designed to prevent such shifting and moving as plastic bags are being transported in a vehicle.

A variety of bag holders have been described in prior-art patents, but none are designed to solve the particular problem addressed by the present invention and none are capable of being modified to do so. For example, U.S. Pat. No. 4,723,740 (1988), issued to Courtemanche et al., teaches a hook for supporting a plastic bag inside a container. Hobbs, in U.S. Pat. No. 3,091,422 (1963), describes a device to be semipermanently mounted in a car for holding a disposable litter bag. U.S. Pat. No. 3,561,077, issued to Grant (1971), also describes a clamp mechanism for holding litter bags in vehicles.

Edstrom's U.S. Pat. No. 1,350,443 (1920) discloses a device adjustable to engage bags of various sizes in an open position for filling. U.S. Pat. No. 5,092,548, issued to Bayes et al. (1992), describes a device for holding an assembly of T-shift bags on a mounting surface; the device allows a single bag to be removed quickly and held open for filling.

U.S. Pat. No. 946,108, issued to Carpenter (1910), and U.S. Pat. No. 1,117,880, issued to McMillin (1914), both describe racks designed to hold open Post Office mail bags for filling. Neither could be practically modified to accomplish the goals of the present invention.

In U.S. Pat. No. 2,576,397 (1951), Grilley describes a body brace for fastening and reinforcing the sides of an open vehicle, such as the sides of a flat bed truck. The device could be modified to accomplish the goals of the present invention; however, because the device is designed to brace and reinforce, its structure, the number of pieces and the assembly required are far more complicated and elaborate than would be needed.

U.S. Pat. No. 5,118,156 to Richard (1992) discloses a load support system for a pick-up bed consisting of two horizontal braces placed above the wheel wells to widen the space available for a load. The structure of the device is geared to providing a frame capable of carrying wide loads that would not fit within the wheel wells of the bed. Even if the device were modified to provide the function of the present invention, the cumbersome, semi-permanent attachment method would be unattractive and unacceptable to the typical transporter of grocery bags. Furthermore, the braces are attached by means of a multi-piece and complicated clamp system that, unlike the present invention, limits its use to vehicles with open sides.

None of the devices described in the foregoing patents is directed to solving the particular problem addressed by the present invention nor could they be adapted to do so. None show a structure similar to the present invention. Therefore, there still exists for a need for a simple, inexpensive, adjustable holding device that enables thin, plastic bags with handles to be anchored to a supporting structure in a vehicle to prevent the bags from shifting about and spilling their contents.

SUMMARY OF THE INVENTION

One objective of this invention is a bag holder rack that can be quickly mounted on the bed of a pick-up truck to provide an anchor for keeping filled plastic grocery bags in an upright position.

Another goal of the invention is a bag holder that is adjustable and that can be adapted for use on different types of vehicles, possibly including internal use within the cabin of a vehicle.

Yet another goal of the invention is a device that can be easily removed when not in use and comfortably stowed away within the vehicle.

A final objective is the economical manufacture of a bag holder rack according to the above-stated criteria. This is achieved by using commercially available components and materials, modified only to the extent necessary to fit the requirements of the invention.

Therefore, according to these and other objectives, the preferred embodiment of the present invention consists of a horizontal rod comprising a first fixed end and a second spring-loaded, telescopic end, both ends being adapted for stable engagement with vertical support walls in a vehicle. The rod contains a plurality of hook means disposed along its length and adapted for receiving the handles of conventional plastic grocery bags and for holding them in an upright position. The hook means are preferably evenly spaced for optimal space utilization during transport of the grocery bags.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

BRIEF DESCRIPTION OF THE DRAWINGS

FIG. 1 is an elevational view of the preferred embodiment of a grocery-bag rack according to the present invention.

FIG. 2 is a partial top plan view of the rack taken from line 2—2 in FIG. 1.

FIG. 3 is a partial side view of the rack taken from line 3—3 FIG. 2

FIG. 4 is a partial perspective view of the rack of FIG. 1 in use while mounted on a pick-up truck bed.

FIG. 5 is a cross-sectional view of the sleeve/rod combination of FIG. 1 wherein a groove and a corresponding engaging tab have been provided to prevent rotational movement between the sleeve and the rod.

FIG. 6 is a partial elevational front view of an alternative embodiment of the gripping means of the invention for clamping engagement with the side walls of a pick-up truck.

FIG. 7 is a top plan view of the embodiment of the gripping means shown in FIG. 6.

FIG. 8 is top plan view of yet another embodiment of the invention having horizontal lateral clamps for mounting of the rack on the tailgate of a pick-up truck.

FIG. 9 is a cross-sectional side view of the embodiment shown in FIG. 8.

DESCRIPTION OF THE PREFERRED EMBODIMENTS

The inventive features of the preferred apparatus of this invention relate to means for holding plastic grocery bags upright along a compression-mounted brace capable of being positioned between any two vertical supporting walls of a vehicle. A simple and inexpensive way to manufacture such a device is provided herein.

Referring to the drawings, wherein like parts are designated throughout with like numerals and symbols, FIG. 1 illustrates in elevational view a plastic grocery-bag holder rack 10 according to the preferred embodiment of the invention. The rack 10 comprises a horizontal brace 11 consisting of a tubular horizontal sleeve 12, preferably having a circular cross-section for ease of construction, capable of slidable telescopic connection with a conforming rod 14. A compression spring 16 is mounted axially inside the sleeve 12 between the inner end 18 of the rod 14 and a stopper inside the sleeve (not shown in the figures). The spring is provided to urge the rod 14 outwardly, so that the sleeve/rod combination is in spring-loaded arrangement when the rod is compressed telescopically into the sleeve. Obviously, the inner end 20 of the sleeve 12 is open to receive the rod 14 and has a cross-section conforming to the geometry of the rod for slidable engagement therewith so as to permit its telescopic longitudinal contraction and expansion. The outer end 22 of the sleeve 12 is sealed, such as by the spring stopper mentioned above, and comprises gripping means 24 for engaging and adhering to a first vertical supporting surface against which the end 22 of the rack may be pressed for mounting. Such gripping means 24 may consist of a rubberized suction cup or high friction knob rigidly attached to the end 22. The outer end 26 of the rod 14 comprises the same or equivalent gripping means 24 for engaging and adhering to a second vertical supporting surface against which the end 26 is pressed for mounting. Thus, the rack 10 may be installed between any two substantially parallel vertical supporting surfaces disposed at a distance that allows the rack to be disposed in compression therebetween, such as the walls of a pick-up truck bed or the interior sides of the cabin of a motor vehicle.

The rack 10 comprises hook means 28 for receiving the handles of conventional plastic grocery bags being transported and for retaining them in an upright position. In the preferred embodiment of the invention, each hook means 28 consists approximately of a quarter-circle section of the cylindrical sleeve 12 which has been cut out and bent outward to form a hook, as illustrated in FIG. 2. This method of construction makes it possible to provide multiple hooks along the length of the rack without fastening any new structure to the sleeve. Rather, tongue-shaped strips are simply cut into the sleeve, such as by stamping, and bent outwardly to form a curved hook. FIG. 3 is a side view of hooks means 28 so formed. Obviously, evenly spaced hooks on alternating sides of the sleeve (as shown in the figures) provide optimal utilization of the available space.

In use, the rack 10 is compressed to fit, for example, within the side walls W of a pick-up truck bed T and is positioned at a height from the bed substantially equal to the height of an upright bag B being carried in the bed, as illustrated in FIG. 4. The hooks 28 are not meant to support the weight of the bags B; rather, they are only designed to hold the handles H of the bags, such that they remain in an upright position and do not slide or roll away during transportation. Note that the gripping means 24 not only prevents the rack 10 from sliding downward under its own weight (so long as sufficient outward tension is provided by the spring 16), but also prevents the sleeve 12 from rotating around its main axis. This feature is important because it ensures the stable engagement and retention of the handles H in the hooks 28. In order to further ensure that the sleeve 12 does not rotate under load and release a portion of the bags connected to the hooks 28, a tab 30 and groove 32 may be provided in mating combination (see in cross-section in FIG. 5) in the sleeve 12 and rod 14, respectively (or vice versa), so that the sleeve and rod are prevented from rotating with respect to one another. Thus, the rod remains in longitudinally slidable connection with the sleeve, but no rotational movement between the two is permitted. This additional linkage provides further stability to the hook means 28 because the friction of both gripping means 24 with the supporting side walls W must be overcome before the sleeve 12 can rotate.

I found that a rack having approximately a 50-inch long sleeve and a rod capable of full extension to a total length of about 70 inches is suitable for use on the bed and in the cabin of most standard-size pick-up trucks. A spacing of about 4 inches between successive hooks, alternating on both sides of the sleeve, provides sufficient room to stow 12 full T-shirt type bags approximately 12 inches wide and 12 inches tall (the common size of standard plastic bags used in grocery stores) efficiently and without excessive crowding. When used with these bags, the rack should be positioned at about 16 inches from the supporting surface, which ensures that the handles of the bags are retained by the hooks while the bags rest on the supporting surface.

Aluminum tubing is preferred to construct the rack of the invention because of its light weight and suitability for press forming, which facilitate manufacture and reduce costs. Gripping means consisting of rubberized suction cups or knobs having a contact surface of about 4 square inches provide adequate friction to retain the rack in place under the load of a spring capable of exerting a pressure of at least one pound per square inch. Note that the force exerted by the spring is only required to support the weight of the rack, as the bags rest substantially on a separate supporting surface.

Other than specifically described, the invention can obviously take other shapes with equivalent functionality and utility. For example, a sleeve and a rod made with square tubular members could be used instead of the cylindrical structures shown in the drawings. Also, two spring-loaded ends, instead of the single one used, could be utilized to anchor the rack 10 to supporting vertical structures. In that case, though, apparatus equivalent to the tab/groove combination described above would be essential to prevent rotation of the sleeve 12. Any shape for any of the components that are specifically described is acceptable to practice the invention so long as it retains the functional characteristics described above. Thus, the hook means 28 and the gripping means 24 could well consist of equivalent devices, although the disclosed method of providing hooks by cutting the sleeve 12 is critical for a simple method of construction.

In a different embodiment of the invention, shown in part in FIGS. 6 and 7, the friction-type gripping means 24 is replaced with a transverse open clamp 34 having two parallel jaws 36 adapted for sliding over the top of the side wall W of the bed of a typical pick-up truck. As seen in FIG. 7, the clamp 34 must be sufficiently long to ensure a stable connection of the rack 10 with the walls of the truck. Obviously, this embodiment of the invention does not provide the versatility of use available with the preferred spring-loaded embodiment because it can only be used between walls disposed at a fixed distance corresponding to the length of the rack. Similarly, the rack 10 must be attached to the clamps 34 at a height corresponding to the height of the bags for which the apparatus is intended. Thus, no vertical adjustments may be made for different vehicles and/or different bags.

In addition, this version of the invention is not suitable for use inside the cabin of a vehicle because it requires side walls for horizontal mounting. An equivalent embodiment could be dedicated to interior use between two windows of a vehicle cabin by providing suitable protective padding 38 inside the jaws 36. Of course, the spacing between the jaws would have to be adapted to fit the intended supporting structure (such as the glass or frame of a window).

In yet another embodiment of the invention designed for use on trucks only (illustrated in FIGS. 8 and 9), a rack 40 comprises a main structure equivalent to the sleeve 12 in a length suitable for fitting between the side walls of various-size vehicles. At least one clamp 34 (preferably two for stability) is attached in parallel to the sleeve 12 (instead of transversely along the rack's main axis) by means of a horizontal lateral arm 42. When two arms 42 are utilized, they are preferably disposed toward the ends 20 and 22 of the sleeve for stability. When only one arm is utilized, it should be placed at the center of the sleeve and the corresponding clamp 34 should be sufficiently long to avoid the rotation of the sleeve around the arm when bags are attached to it. As illustrated in FIG. 9, the rack 40 is mounted on the bed of a pick-up truck by fitting the open clamps 34 over the tailgate G. As in the case of the embodiment of FIG. 6, the sleeve 12 must be attached to the clamps 34 at a height corresponding to the height of the bags for which the apparatus is intended.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

I claim:

1. A rack for holding filled plastic bags equipped with handles in an upright position while being transported in a vehicle, comprising:

(a) a horizontal brace;

(b) a plurality of hook means rigidly connected to said horizontal brace and adapted to receive and retain handles of plastic bags hooked thereon; and (c) gripping means rigidly connected to said horizontal brace and adapted for engagement with at least one vertical supporting wall for removably mounting said rack on the vehicle;

said gripping means comprising at least one spring-loaded slideable compression means telescopically connected to an end of said brace, said slideable compression means including a friction member for compressive engagement with said vertical supporting wall;

whereby the rack may be installed above a surface supporting the bags in the vehicle such that the bags are held in an upright position.

2. The rack of claim 1, wherein said horizontal brace consists of a sleeve comprising said plurality of hook means and said spring-loaded slidable compression means consists of a slidable rod telescopically connected to the sleeve and urged outwardly by a compression spring mounted axially inside the sleeve.

3. The rack of claim 2, wherein said plurality of hook means consists of tongue-shaped strips cut into the sleeve and bent outwardly to form a curved hook.

4. The rack of claim 1, wherein said gripping means comprises a friction knob connected to an outer end of said sleeve and comprises one spring-loaded slidable compression means wherein said friction member is a friction knob.

5. The rack of claim 1, wherein said gripping means comprises a suction cup connected to an outer end of said sleeve and comprises one spring-loaded slidable compression means wherein said friction member is a suction cup.

6. The rack of claim 4, wherein said plurality of hook means consists of tongue-shaped strips cut into the sleeve and bent outwardly to form a curved hook.

7. The rack of claim 5, wherein said plurality of hook means consists of tongue-shaped strips cut into the sleeve and bent outwardly to form a curved hook.

* * * * *